July 30, 1968
H. OETIKER
3,394,532
PNEUMATIC DUST EXTRACTION PLANT
Filed Nov. 10, 1964
4 Sheets-Sheet 1
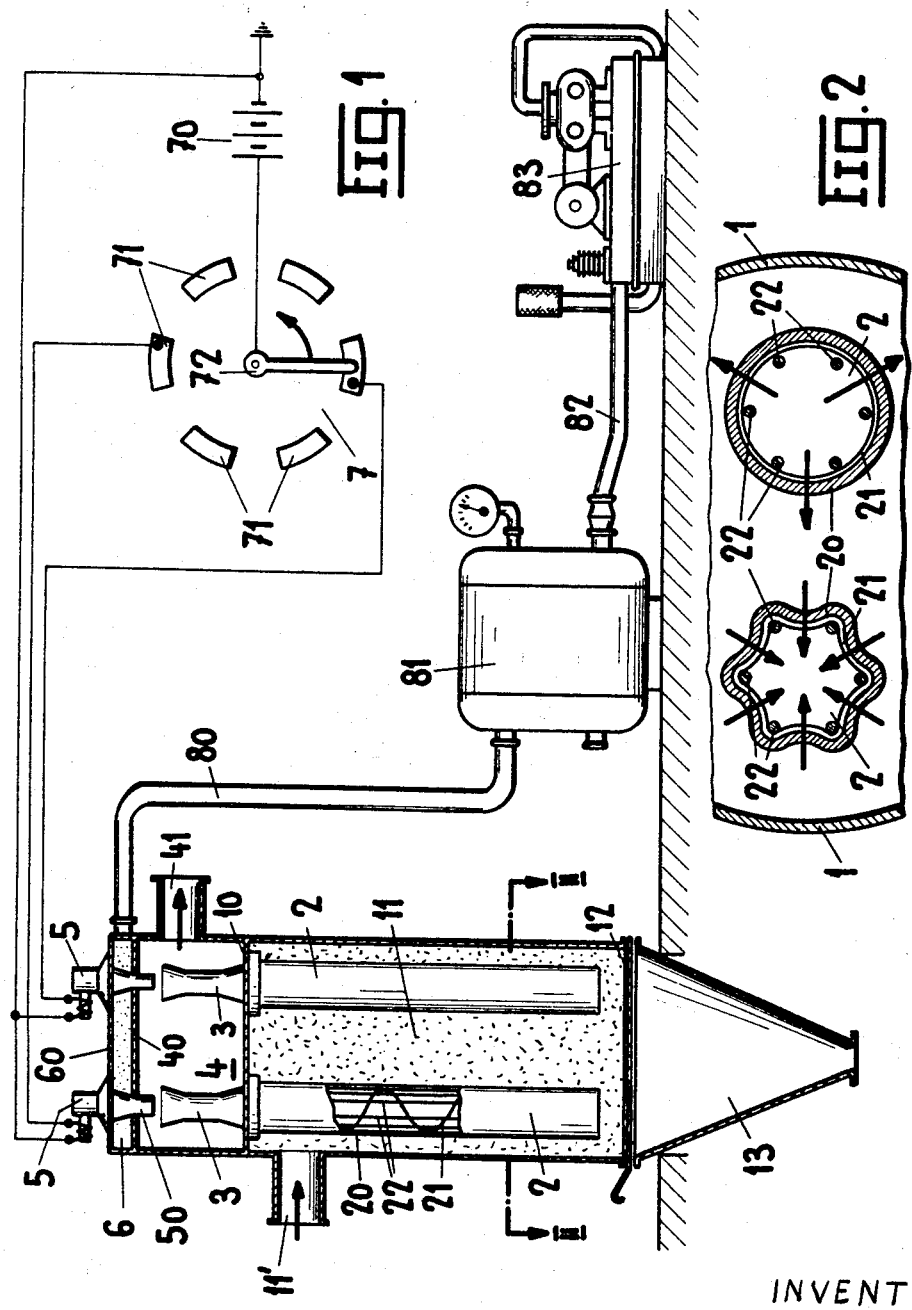
INVENTOR
HANS OETIKER

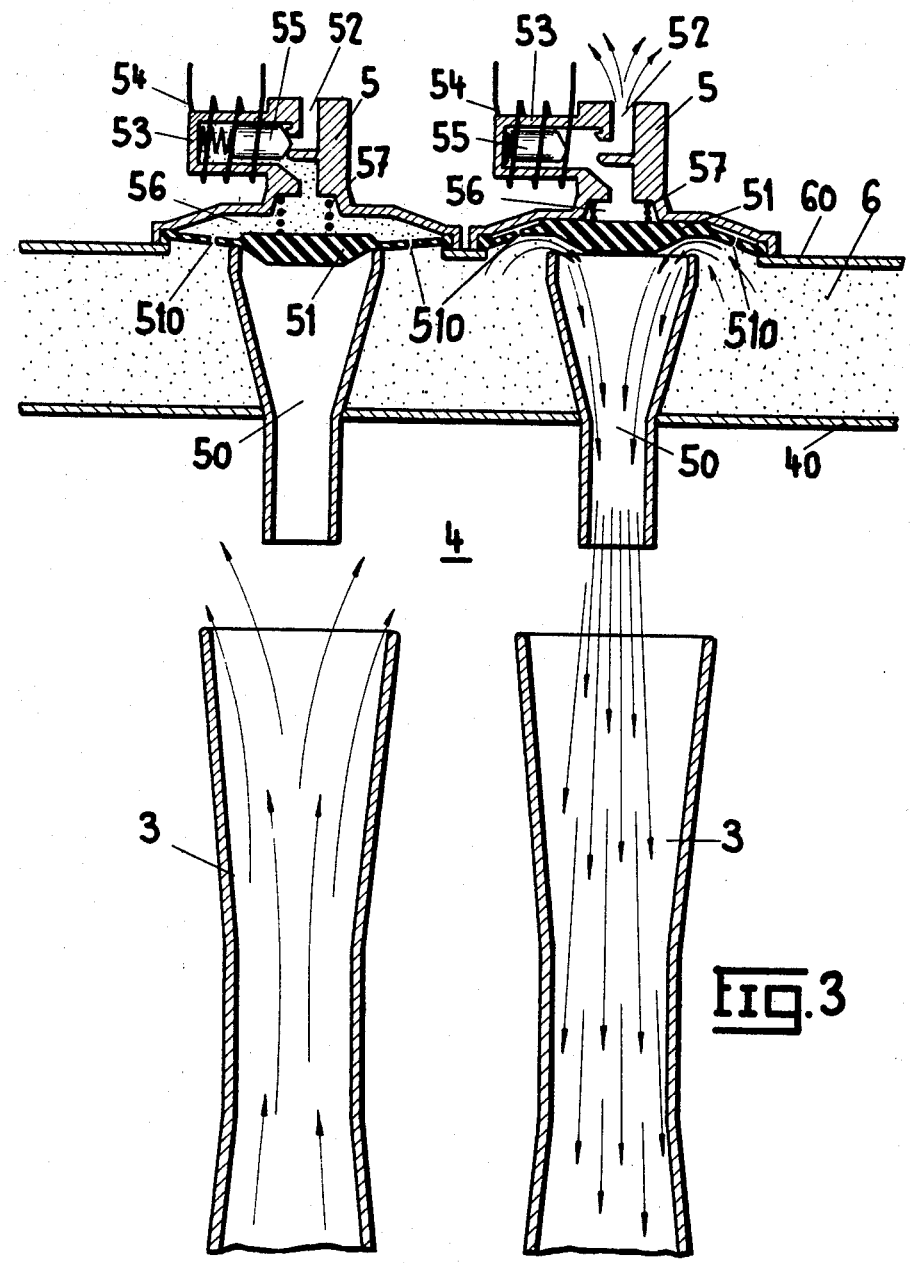

INVENTOR
HANS OETIKER

July 30, 1968  H. OETIKER  3,394,532
PNEUMATIC DUST EXTRACTION PLANT
Filed Nov. 10, 1964  4 Sheets-Sheet 4

INVENTOR
HANS OETIKER

# United States Patent Office 3,394,532
Patented July 30, 1968

3,394,532
PNEUMATIC DUST EXTRACTION PLANT
Hans Oetiker, Saint Gall, Switzerland, assignor to Gebruder Buhler Maschinenfabrik, Uzwil, Switzerland
Filed Nov. 10, 1964, Ser. No. 410,056
Claims priority, application Switzerland, Nov. 18, 1963, 14,194/63; Feb. 20, 1964, 2,065/64
9 Claims. (Cl. 55—302)

ABSTRACT OF THE DISCLOSURE

Means for cleaning the filter elements of a pneumatic dust extraction plant by reverse flow of air through the filter elements and into a dusty air chamber. This reverse flow of air, through the wall of a filter element, dislodges dust accumulated on the external surface thereof and furthermore, due to reverse mechanical distortion of the wall of the filter element, additionally promotes dislodgement of dust.

In accordance with the disclosure, plural filter hoses, each having a closed bottom end, are suspended in a dusty air chamber and have their open upper ends, forming discharge outlets, communicating with a clean air chamber. A rinsing air nozzle is arranged coaxially of the open upper end of each filter hose and in axially spaced opposition thereto to selectively direct a blast of rinsing air into the associated filter hose in a reverse direction. A source of rinsing air, at a pressure in excess of that in the dusty air chamber, is in constant communication with the rinsing air chamber, and the inlet ends of the rinsing air nozzles are positioned in the rinsing air chamber. The inlet end of each scavenging air nozzle has a diaphragm operatively associated therewith and having a central imperforate area of a diameter in excess of the inlet end of the rinsing air nozzle and normally closing such inlet end. This diaphragm has one surface subjected to the pressure in the rinsing air chamber, and a counter pressure chamber, respective to each diaphragm, has one wall defined by the opposite surface of the associated diaphragm. Each diaphragm has restricted orifices outside the central imperforate area thereof and establishing constant communication between the rinsing air chamber and the respective counter pressure chamber, and a normally closed, selectively openable valve is operatively associated with each respective counter pressure chamber and effective, when open, to connect the latter to a zone at a pressure lower than that in the rinsing chamber. Control means are connected to each valve and are operable to open the valves periodically for a relatively short time interval to lift the associated diaphragm for flow of air from the rinsing air chamber into the rinsing air nozzle, to reverse the flow through the associated filter hose, to dislodge dust from the external surface of the latter in the dusty air chamber by reverse air flow through the wall of the filter hose and mechanically by reverse distortion of such wall.

The rinsing air chamber may be under a source of constant pressure provided by a pump, pressure tank or the like, or the filtered air chamber may be connected to a source of vacuum and the rinsing air chamber to ambient atmosphere. Heating means may be provided for the rinsing air, as well as filtering and drying means for the rinsing air. Preferably, the valves are electromagnetically operated valves and the respective valves are operated in sequence by a cyclic control.

Background of the invention

The present invention relates to a dust extraction plant for dust-laden air, for example for the exhaust air of flour mills. In a known kind of such dust extraction plant, the dust-laden air is blown or sucked into a dusty air chamber, wherein filter hoses closed at the bottom are suspended, the walls of which consist of felt, glass fibre fabric, or a similar filter material. The open end of each filter hose is inserted in the bottom of a clean-air chamber which closes the dusty-air chamber on top, and above these open ends vertical nozzle sockets are arranged, from which the filtered air flows into the open air or to a consumer station. The dust filtered out of the air is deposited on the outer wall surfaces of the filter hoses and thereby increases the pressure drop of the air penetrating the same. In order to remove the accumulated dust, from time to time rinsing air is blown from inside through each filter hose, which air is blown from a blow nozzle directed into the orifice of the associated nozzle socket at the outlet of an associated control valve by opening this valve. The cleansing effect of this compressed rinsing air is better the quicker a sufficient excess pressure is built up in the hose, in order to force the air from inside through the walls of the hoses into the dusty-air chamber, since the hoses walls, which previously had been pressed inward, are blown up with a jerk and thereby the dust layer adhering outside is subjected also to a mechanical shaking which favours its detachment from the walls of the filter hoses. The dust shaken off thereby drops on the floor of the dusty-air chamber and can be removed therefrom from time to time by opening the bottom. The rinsing air also cleans the pores of the filter hoses when emerging from them.

The desired short-lasting jerkily incipient pulses of rinsing air could be produced hitherto sufficiently well only with rinsing air of high excess pressure of 6 to 9 atmospheres gauge, and one of the main reasons was that the required sufficiently rapidly opening and closing valves were available only for high pressure air. On the other hand, it is necessary in this case also to use high pressure pumps which can be constructed in such a manner that they supply a clean rinsing air free from oil and condensed water, in order to prevent any soiling of the filter hoses from inside when rinsing. Such high pressure pumps require careful periodical servicing in order to prevent breakdowns in operation.

The present invention has the primary object of providing a pneumatic dust extraction plant which produces effective cleaning of the filter surfaces at comparatively low pressure, which is of simple construction, and can be operated continuously without interruption by cleansing operations.

With these and other objects in view which will become apparent later from this specification and the accompanying drawings I provide a pneumatic dust extraction plant comprising in combination: a dusty-air chamber, filter hoses closed at their bottom, suspended in said chamber, a clean-air chamber, nozzle sockets in communication with said filter hoses and extending into said clean-air chamber, rinsing air blow nozzles extending into said clean-air chamber and each directed towards one of said nozzle sockets, a source of rinsing air, valves connected with said source, each of said valves being associated with one of said blow nozzles, a cyclic control operatively connected with said valves and alternately opening the same in turn at predetermined time intervals, and means for keeping, in operation, said source of rinsing air at an excess pressure of 1 kg./cm.$^2$ maximum over the pressure prevailing in said clean-air chamber. Provided that, for example, the clean-air chamber in operation is kept under vacuum for sucking the air to be freed from dust through the filter hoses, the ambient atmosphere may form the source for the rinsing air. When this is not possible i.e., when the operational pressure in the clean-air chamber corresponds substantially to normal pressure, so that a separate pump has to be provided as a source of rinsing air, a simple blower suffices for generating an excess pressure of only 1 kg./cm.², e.g., a rotary piston blower which yields an air free from oil and condensate without requiring special precautions and which also allows the preheating of the rinsing air without any difficulties.

Such preheating of the rinsing air is of great advantage particularly when it is to be expected that also dusty air of comparatively high humidity is to be supplied to the dust extraction plant, which upon small changes of state tends to the deposition of condensate, a fact which would have unfavorable results for the plant.

Obviously the use according to the invention of a source of rinsing air of only 1 kg./cm.² excess pressure or even less involves the use of nozzle sockets, rinsing air blow nozzles and associated valves of correspondingly large inside diameters.

In an advantageous embodiment of the invention, provision is made that the internal orifices of the rinsing air blow nozzles extend into the interior of a rinsing air chamber, which is in constant communication with the source of rinsing air, and can there be obturated by the central portion of an associated diaphragm of substantially larger diameter than the nozzle orifices concerned, a counter-pressure chamber in constant communication with the rinsing air chamber through restricted orifices being capable of being connected with a space at lower operational pressure than that prevailing in the rinsing air chamber by means of an electrically controllable blow-off valve of considerably large aperture cross sectional area than the total area of the restricted orifices, for the purpose of opening the closure of the diaphragm.

From this arrangement follow the great advantages that only a single supply line has to be conducted from the source of rinsing air to the rinsing air chamber, which line can be made heatable if necessary, in a simple manner, and that the diaphragm, which under the action of the excess pressure of the rinsing air constantly obturates the rinsing air blow nozzles, clears jerkily the admission to the rinsing air blow nozzles at their full area, when the associated blow off valve is opened.

In the dust extraction plant according to the invention provision can also be made that, as the source of the rinsing air, the same blower may be used which is available for conveying the air to be freed of dust through the dust extraction plant.

This arrangement has the advantage that a separate blower for the rinsing air is dispensed with.

Embodiments of dust extraction plants according to the invention are illustrated by way of example in the accompanying drawings, in which:

FIG. 1 shows a general arrangement of one embodiment,

FIG. 2 is a cross section of the dust extraction chamber of FIG. 1.

FIG. 3 shows on a larger scale two control valves for the generator of the rinsing air pulses, in the open and closed condition respectively.

Figure 4:
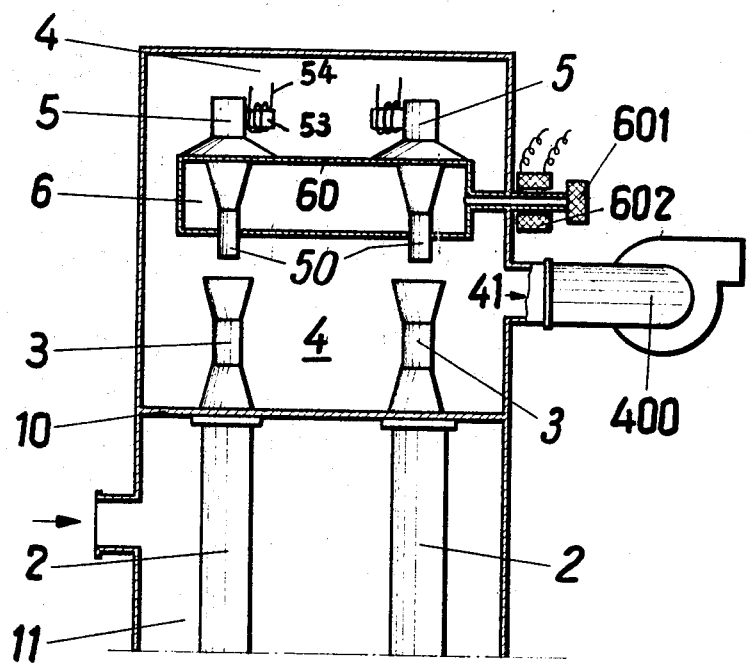
FIG. 4 is a modification of FIG. 1.

In accordance with FIG. 1, an upright cylindrical dust extraction device is provided, which forms the dusty-air chamber 11. On its upper closure plate 10 several passage holes are arranged. On the underside of said plate a number of filter hoses 2 and, on its top surface, a respective nozzle socket 3 for each filter hose, are attached.

The walls 20 of the filter hoses consist of felt and are supported inside by a plurality of reinforcement bars 22 running in the direciton of generatrices and supported against one another by a coil 21. The filter hoses are closed at their lower ends.

A supply pipe 11' for dust laden air discharges into the dusty-air chamber 11. The nozzle sockets 3 on top of the passage holes of the closure plate 10 are constructed as venturi nozzles.

These venturi nozzles 3 discharge freely into a clean-air chamber 4 arranged above the closure plate 10 of the dusty-air chamber, and a discharge pipe 41 from chamber 4 leads into the open air.

In the upper closure plate 40 of the clean air chamber 4, blow nozzles 50 are inserted in the axial direction of the nozzle sockets 3 and with their upper edges constructed as seats for the closure diaphragms 51 (FIG. 3) of control valves 5, which latter are mounted on a plate 60 above the blow nozzles 50, which plate forms the upper closure of a pressure chamber 6.

Each valve 5 is formed with a passage or bore 52, as shown in FIG. 3, and leading into the open air, and is further formed with a transverse socket 53 communicating with the passage 52. An energizing coil 54 is wound around the exterior surface of each socket 53, and forms part of an electromagnet including a magnetizable, spring-biased magnetic core forming a valve control body 55 which is displaceable along socket 53. In the deenergized condition of winding 54, control body 55 blocks the outlet from counter pressure chamber 56 into passage 52. Counter pressure chamber 56 is located above diaphragm 51 and has one wall defined by the upper surface of this diaphragm. A spring 57 biases the closure diaphragm 51 against the valve seat of the associated blow nozzle 50. Through one or more restricted orifices 510 in the closure diaphragm 51, compressed air can pass from the chamber 6 into the chamber 56 located on top of the closure diaphragm 51, so that therein a pressure equal to that prevailing in the chamber 6 is built up, which, on the one hand, forces the closure diaphragm more strongly on the valve seat of the blow nozzle 50 and, on the other hand, drives the control body 55 into its closing position. When an electric current is passed through the coil 54, the magnetic field thus generated pulls the control body 55 back into its transverse socket so that compressed air can escape through the passage 52 into the open air. For this purpose the clear cross-sectional area of the blow-off passage must be substantially larger than the total cross sectional area of the restricted orifices 510 connecting the rinsing air chamber 6 with the counter-pressure chamber 56. The excess pressure of the air in the rinsing air chamber 6 loads the annular zone of the closure diaphragm 51 surrounding the valve seat and lifts the same off its valve seat, whereafter the whole underside of the closure diaphragm is exposed to the compressed air in the chamber 6 and the diaphragm is forced back with a jerk into the open position, in which it offers unhampered access to the compressed air from chamber 6 to the blow nozzle 50. Accordingly, compressed air flows in a sharp beam from the blow nozzle 50 into the venturi nozzle socket 3 below it, and through the same into the associated filter hose 2, wherein an excess pressure of about 200–600 mm. water column is built up within a period of about 10 to 50 m./sec. after the beginning of the electric current flow through the coil 54, under the action of which excess pressure the filter hose is blown up with a jerk at a corresponding rate, and rinsing air is driven from the interior of the hose through the felt walls 20 into the dusty-air chamber 1. Consequently the layer of dust accumulating on the felt wall 20 drops off to the bottom 12 of the dusty-air chamber.

When after about 100 to 200 m./sec. the current through the coil 54 is interrupted, the valve 5 closes again.

For the alternate actuation in turn of the six valves 5 an electric control means 7 (FIG. 1) is provided, which is here constructed as a rotary switch with six fixed contacts 71 each connected with one terminal of a respective coil 54, and one rotary contact arm 72 connected with one pole of a source of voltage 70, which arm is driven for example by a motor. The other terminals of the coils 54 are connected to the grounded second pole of the source of voltage 70, so that each valve is opened alternately in turn for a short period, in order to cleanse the associated filter hose. Obviously the electrical control means could be constructed differently, preferably without mechanically moved components and with purely electronic sequence switches, e.g., transistors.

For the feeding of the compressed air chamber 6 with clean compressed air for rinsing the filter hoses 2 this chamber is connected by a pipe 80 with a compressed air container 81, which is in turn charged through a pipe 82 by a low pressure compressor 83, e.g. a rotary piston compressor or, with particular advantage, a diaphragm compressor, with compressed air free of oil and condensate, of 0.3 to 0.5 kg./cm.$^2$ gauge, approximately, and which has the required capacity for generating the pressure air pulses necessary for the rinsing of the filter hoses. The bottom 12 of the dust chamber 1 is constructed as a slide, by the opening of which the accumulated dust is discharged into a discharge hopper 13.

While in the embodiment described the air to be freed from dust is blown under excess pressure into the dusty-air chamber 11 through the entrance pipe 11′ provision is made in the modified embodiment according to FIG. 4 for having the outlet port 41 of the clean-air chamber 4 connected with a suction pump 400 which in operation keeps the clean-air chamber 4 under vacuum, in order to suck the air to be freed from dust through the filter hoses 2. According to FIG. 4 provision may be made for building the rinsing air chamber 60 with the rinsing air blow nozzles 50 and the blow-off valves 5 as a whole into the interior of the appropriately enlarged clean-air chamber 4, and for using the free atmosphere as the source of rinsing air. Then the ambient air aspirated may be cleansed by a filter 601 and preheated by an electric heating element 602.

Consequently a pump for supplying the required rinsing air can be dispensed with altogether.

Figure 5:
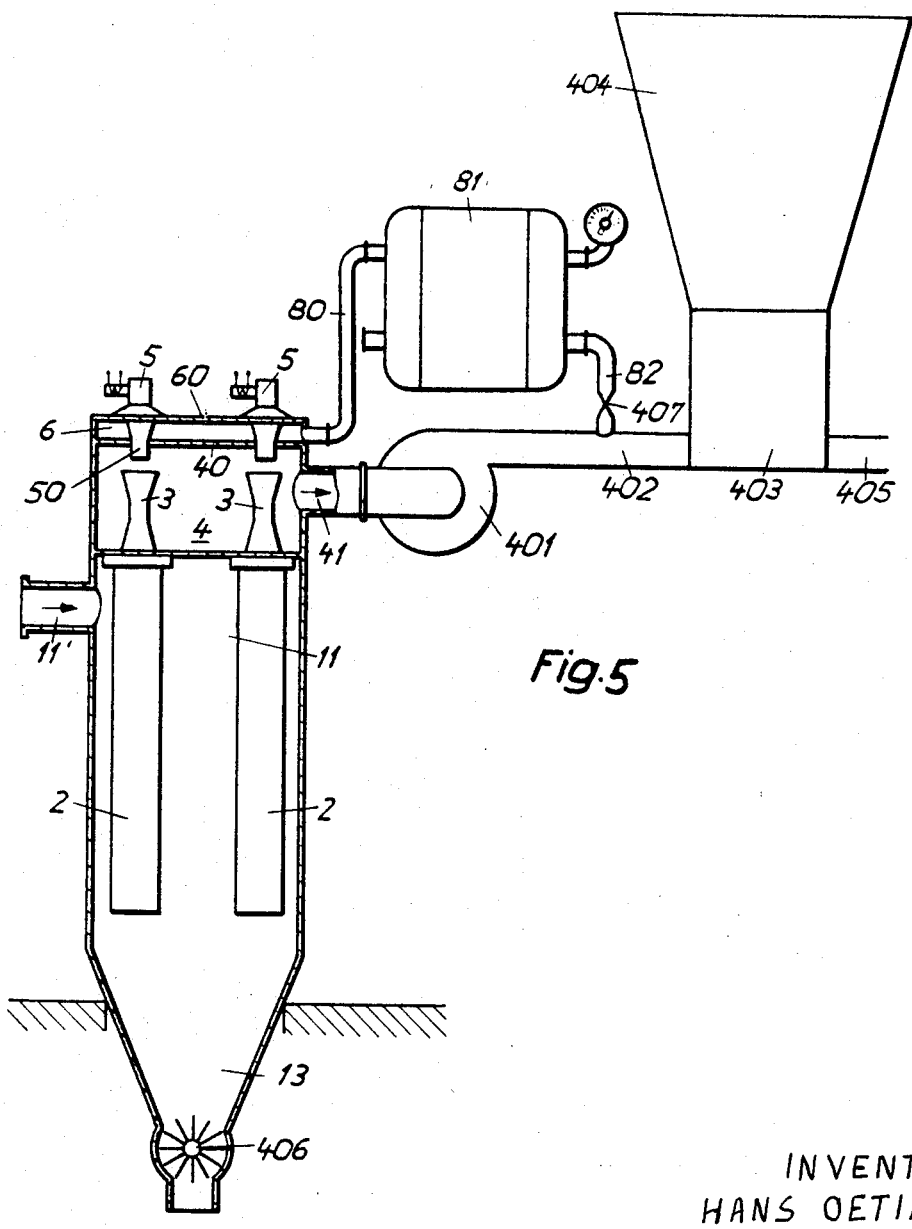
FIG. 5 shows a general arrangement of a material conveyor in combination with a further embodiment of the invention.

FIG. 5 of the drawings shows a material conveyor in combination with yet another embodiment of the invention. Insofar as possible, the the same reference characters as used in FIG. 1 have been used in FIG. 5.

Referring to FIG. 5, a blower 401 has a suction side connected to and communicating with outlet port 4 of dusty air chamber 11. The material to be conveyed is disposed in a container 404 having a discharge end leading into a flow restriction means such as sluice 403. Sluice 403 may have, solely by way of example, the same construction as shown for sluice 406 at the dust discharge outlet of the dusty air chamber 11. An outlet conduit 402 for clean air is connected at one end to the pressure side of blower 401 and at its opposite end the air inlet side of sluice 403. The material to be conveyed, as discharged from container 404 into sluice 403, is transported along a discharge pipe 405 connected to the air and material discharge side of sluice 403.

A compressed air container 81 has an outlet connected by a pipe 80 to the pressure chamber 6, for supply of air under pressure to pressure chamber 6. Air under pressure is supplied to compressed air container 81 through a pipe 82 connected to the pipe 402 which is, in turn, connected to the pressure outlet of blower 401. Pipe 82 has interposed therein, between pipe 402 and compressed air container 81, a non-return or check valve 407 which prevents back flow of air from compressed air container 81 into pipe 402, should the pressure in pipe 402 decrease below that in compressed air container 81. The sluice 403, which receives the material to be conveyed from container 404 and delivers the material to pipe 405, constitutes an additional resistance in the flow path of air discharged from blower 401 through pipe 402 and flowing through sluice 403 to pipe 405. This additional resistance constituted by the sluice 403 provides for an effective flow of air from pipe 402 through check valve 407 and conduit 82 into compressed air container 81 to build up the pressure in compressed air container 81.

Due to the resistance to flow offered by sluice 403, there is an appreciable pressure drop across sluice 403 resulting in the pressure in pipe 402 being substantially higher than the pressure in pipe 405. This causes the air under pressure from blower 401 to flow through non-return or check valve 407 into pipe 82 and then into the tank 81, charging the tank 81. The air under pressure is retained in tank 81 due to the check valve 82, until such time as air is discharged through line 80 for rinsing purposes. The arrangement shown in FIG. 5 is an advantageous improvement, particularly with respect to larger plants where dusty materials must be conveyed and separated, with the conveying air being cleaned and used again.

While I have herein described and illustrated in the accompanying drawings what may be considered typical and particularly useful embodiments of my said invention, I wish it to be understood, that I do not limit myself to the particular details and dimensions described and illustrated; for obvious modifications will occur to a person skilled in the art.

What I claim as my invention and desire to secure by Letters Patent is:

1. A pneumatic dust extraction plant comprising, in combination, a housing forming a dusty air chamber having a dusty air inlet, discharging dusty air into said dusty air chamber, and a dust outlet; at least one filter hose suspended downwardly from an upper closure plate in said chamber and having a closed bottom end; a filtered air chamber in said housing having its lower wall defined by said closure plate and having a filtered air outlet; each filter hose having an open upper end opening into said filtered air chamber through an opening in said closure plate; at least one rinsing air nozzle extending into said filtered air chamber coaxially with a respective filter hose open end and in axially spaced opposition to the latter, for directing rinsing air through said open upper end into the filter hose; a source of rinsing air at a pressure in excess of that in said dusty air chamber; a rinsing air chamber in said housing; means establishing constant communication between said rinsing air chamber and said source of rinsing air, the inlet end of said rinsing air nozzle being positioned in said rinsing air chamber; at least one diaphragm operatively associated with a respective rinsing air nozzle and having a central imperforate area of a diameter in excess of the inlet end of the associated rinsing air nozzle and normally closing such inlet end, said diaphragm having one surface subjected to the pressure in said rinsing air chamber; at least one counter pressure chamber having one wall defined by the opposite surface of a respective diaphragm; at least one normally closed selectively openable valve operatively associated with a respective counter pressure chamber and, when open, connecting the latter to a zone at a pressure lower than that in said rinsing air chamber; and control means connected to each valve and operable to open the same periodically for a relatively short time interval to lift the associated diaphragm for flow of air from said rinsing air chamber into the associated rinsing air nozzle to reverse the flow through the associated filter hose to dislodge dust from the exterior surface of the latter in said dusty air chamber by reverse air flow through the wall of said filter hose and mechanically jerking said wall.

2. A pneumatic dust extraction plant, as claimed in claim 1, in which each diaphragm has restricted orifices outside the central imperforate area and establishing constant communication between said rinsing air chamber and the associated respective counter pressure chamber; each valve having a passage with a free flow cross-sectional area substantially in excess of the sum of the areas of the restricted orifices in the associated diaphragm.

3. A pneumatic dust extraction plant, as claimed in claim 2, in which said valves are electromagnetically operated valves and said control means comprises cyclic control means operatively connected with said electromagnetic valves and opening and closing the same in sequence.

4. A pneumatic dust extraction plant as claimed in claim 1, comprising a source of vacuum connected to said filtered air chamber and sucking the air to be freed from dust through said filter hoses; the free atmosphere forming the source of the rinsing air.

5. A pneumatic dust extraction plant as claimed in claim 1, comprising a source of compressed air, said rinsing air chamber being a compressed air chamber connected to said compressed air source and having a cover plate and a bottom, said rinsing air nozzles being inserted in said bottom, said valves being solenoid valves inserted in said cover plate, and a cyclic electric control means connected with said solenoid valves and opening the same sequentially in turn.

6. A pneumatic dust extraction plant as claimed in claim 1, comprising heating means preheating the rinsing air supplied from said source of rinsing air to said scavenging air nozzles.

7. A pneumatic dust extraction plant, as claimed in claim 1, in which the differential between the pressure of said source of rinsing air and the pressure in said dusty air chamber has a maximum of 1 kg./cm..

8. A pneumatic dust extraction plant, as claimed in claim 1, including at least one filtered air discharge nozzle extending into said filtered air chamber and discharging into the upper end of a respective filter hose; said rinsing air nozzle being in coaxial axially spaced opposition to the discharge outlet of said filtered air discharge nozzle.

9. A pneumatic dust extraction plant, as claimed in claim 1, including a blower serving as said source of rinsing air and having a suction inlet connected to the filtered air outlet of said filtered air chamber, whereby said blower creates a pressure differential across said dusty air chamber between the inlet of said dusty air chamber and the outlet of said filtered air chamber for forcing the dusty air through said filter hoses; a clean air outlet conduit connected to the pressure outlet of said blower and having an outlet end; a clean air discharge pipe having an inlet end; flow restriction means connected between the outlet end of said clean air conduit and the inlet end of said clean air discharge pipe and providing an additional flow resistance between the pressure outlet of said blower and said clean air discharge pipe; and means for connecting said clean air outlet conduit to said rinsing air chamber and including a branch pipe having an inlet connected to said clean air outlet conduit between the pressure outlet of said blower and said flow restricting means.

References Cited

UNITED STATES PATENTS

| | | | |
|---|---|---|---|
| 1,928,670 | 10/1933 | McCrery | 55—341 X |
| 2,531,343 | 11/1950 | Patterson | 55—267 X |
| 2,583,039 | 1/1952 | Boesger | 55—341 X |
| 3,178,868 | 4/1965 | Gibby | 55—302 X |

FOREIGN PATENTS

| | | |
|---|---|---|
| 225,059 | 10/1959 | Australia. |
| 914,187 | 12/1962 | Great Britain. |

HARRY B. THORNTON, *Primary Examiner.*

S. W. SOKOLOFF, *Assistant Examiner.*